(12) United States Patent
Zhang et al.

(10) Patent No.: US 12,450,189 B2
(45) Date of Patent: Oct. 21, 2025

(54) USB TYPE-C CONNECTORS AND RELATED CONTROLLERS WITH VOLTAGE CONTROL PERTAINING TO DISCONNECTION DETECTION

(71) Applicant: ON-BRIGHT ELECTRONICS (SHANGHAI) CO., LTD., Shanghai (CN)

(72) Inventors: Changshan Zhang, Shanghai (CN); Zhiqiang Wang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 27 days.

(21) Appl. No.: 18/090,934

(22) Filed: Dec. 29, 2022

(65) Prior Publication Data

US 2023/0214349 A1    Jul. 6, 2023

(30) Foreign Application Priority Data

Jan. 5, 2022   (CN) .......................... 202210008920.2

(51) Int. Cl.
*G06F 13/42*   (2006.01)
*G06F 13/38*   (2006.01)

(52) U.S. Cl.
CPC ........ *G06F 13/4282* (2013.01); *G06F 13/382* (2013.01); *G06F 2213/0042* (2013.01)

(58) Field of Classification Search
CPC .............. G06F 13/4282; G06F 13/382; G06F 2213/0042

(Continued)

(56) References Cited

U.S. PATENT DOCUMENTS 10,338,656 B1 *   7/2019   Nayak .................... G06F 1/266
10,353,853 B1 *   7/2019   Khamesra ............. G06F 13/362
(Continued)

FOREIGN PATENT DOCUMENTS

CN    103208688 A    7/2013
CN    105281153 A    1/2016
(Continued)

OTHER PUBLICATIONS

Taiwan Patent Office, Office Action mailed Feb. 10, 2023, in Application No. 111108082.
(Continued)

*Primary Examiner* — Tim T Vo
*Assistant Examiner* — Henry W Yu
(74) *Attorney, Agent, or Firm* — Faegre Drinker Biddle & Reath LLP

(57) ABSTRACT

USB controller for one or more USB connectors and method thereof. For example, a USB controller for one or more USB connectors includes: a detector configured to receive a first input signal from a first pin of a first USB connector and receive a second input signal from a second pin of the first USB connector and generate a detection signal based at least in part on the first input signal and the second input signal; a logic controller configured to receive the detection signal and generate a first control signal and a second control signal based at least in part on the detection signal; a driver configured to receive the first control signal, generate a drive signal based at least in part on the first control signal, and output the drive signal to a first transistor terminal of a transistor.

12 Claims, 9 Drawing Sheets

(58) Field of Classification Search
USPC ................ 710/8, 10, 14, 15, 36, 38, 62, 105
See application file for complete search history.

(56) References Cited

U.S. PATENT DOCUMENTS

| | | |
|---|---|---|
| 2017/0070010 A1* | 3/2017 | Zupke ................. G06F 13/4081 |
| 2017/0147526 A1 | 5/2017 | Chen et al. |
| 2018/0232021 A1* | 8/2018 | Perchlik .................. G06F 1/206 |
| 2019/0004584 A1* | 1/2019 | Nge .................... G06F 13/4282 |
| 2020/0033924 A1* | 1/2020 | Waters ................ G06F 13/4068 |

FOREIGN PATENT DOCUMENTS

| | | |
|---|---|---|
| CN | 108899962 A | 11/2018 |
| CN | 111381118 A | 7/2020 |
| CN | 111510220 A | 8/2020 |
| CN | 113162161 A | 7/2021 |
| CN | 113824097 A | 12/2021 |
| CN | 113872280 A | 12/2021 |
| TW | 201216570 A | 4/2012 |
| TW | 202107296 A | 2/2021 |

OTHER PUBLICATIONS

China Patent Office, Office Action mailed Aug. 29, 2023, in Application No. 202210008920.2.
Taiwan Patent Office, Office Action mailed Jan. 4, 2024, in Application No. 111108082.

* cited by examiner

FIG. 2
Prior Art

USB TYPE-C CONNECTORS AND RELATED CONTROLLERS WITH VOLTAGE CONTROL PERTAINING TO DISCONNECTION DETECTION

CROSS-REFERENCES TO RELATED APPLICATIONS

This application claims priority to Chinese Patent Application No. 202210008920.2, filed Jan. 5, 2022, incorporated by reference herein for all purposes.

BACKGROUND OF THE INVENTION

Certain embodiments of the present invention are directed to electronic devices and/or circuits. More particularly, some embodiments of the invention provide USB receptacles and related controllers. Merely by way of example, some embodiments of the invention have been applied to USB Type-C. But it would be recognized that the invention has a much broader range of applicability.

With the development of consumer electronics, input/output terminals often require faster charging speed and/or stronger compatibility for Universal Serial Bus (USB) interfaces. As an example, for this reason, USB Type-C has been proposed. For example, one type of a USB Type-C connector is a USB Type-C receptacle (e.g., a USB Type-C female connector), and another type of a USB Type-C connector is a USB Type-C plug (e.g., a USB Type-C male connector).

FIG. 1 is a simplified diagram showing a conventional pin distribution of a USB Type-C receptacle, and FIG. 2 is a simplified diagram showing a conventional pin distribution of a USB Type-C plug. As shown in FIG. 1, the USB Type-C receptacle 100 includes twenty four pins, which are numbered from A1 through A12 and from B1 through B12. For example, the A5 pin is the CC1 pin, and the B5 pin is the CC2 pin. As an example, each of the A1 pin, the A12 pin, the B1 pin, and the B12 pin is a GND pin. For example, each of the A4 pin, the A9 pin, the B4 pin, and the B9 pin is a VBUS pin. As shown in FIG. 2, the USB Type-C plug 200 includes twenty four pins, which are numbered from A1 through A12 and from B1 through B12. For example, the A5 pin is the CC pin, and the B5 pin is the VCONN pin as shown in FIG. 2. As an example, each of the A1 pin, the A12 pin, the B1 pin, and the B12 pin is a GND pin. For example, each of the A4 pin, the A9 pin, the B4 pin, and the B9 pin is a VBUS pin.

As shown in FIG. 1 and FIG. 2, the USB Type-C receptacle 100 and the USB Type-C plug 200 form a USB Type-C charging interface. When the USB Type-C plug 200 is plugged into the USB Type-C receptacle 100, the Aj pin of the USB Type-C receptacle 100 makes a contact with the Aj pin of the USB Type-C plug 200, and the Bj pin of the USB Type-C receptacle 100 makes a contact with the Bj pin of the USB Type-C plug 200, wherein j is a positive integer smaller than thirteen. For example, the A5 pin (e.g., the CC1 pin) of the USB Type-C receptacle 100 makes a contact with the A5 pin (e.g., the CC pin) of the USB Type-C plug 200, and the B5 pin (e.g., CC2) of the USB Type-C receptacle 100 makes a contact with the B5 pin (e.g., VCONN) of the USB Type-C plug 200.

FIG. 3 is a simplified diagram showing conventional metal tongues inside the USB Type-C receptacle 100 as shown in FIG. 1, and FIG. 4 is a simplified diagram showing one or more conventional metal tabs inside the USB Type-C plug 200 as shown in FIG. 2.

As shown in FIG. 3, a metal tongue 310 and a metal tongue 320 are separated by an insulator 330. The metal tongue 310 is part of the pin An, and the metal tongue 320 is part of the pin B(13-n), wherein n is a positive integer smaller than thirteen. For example, if n is equal to 5, the metal tongue 310 is part of the pin A5, and the metal tongue 320 is part of the pin B8. In some examples, each of the twenty four pins (e.g., numbered from A1 through A12 and from B1 through B12) of the USB Type-C receptacle 100 includes a metal tongue. For example, the USB Type-C receptacle 100 includes twenty four metal tongues corresponding to the twenty four pins (e.g., numbered from A1 through A12 and from B1 through B12) respectively. As an example, the twenty four metal tongues of the corresponding twenty four pins (e.g., numbered from A1 through A12 and from B1 through B12) of the USB Type-C receptacle 100 all have the same length.

As shown in FIG. 4, the connection stability between the USB Type-C receptacle 100 and the USB Type-C plug 200 depends on the stress exerted by the metal tab inside the USB Type-C plug 200. When the USB Type-C plug 200 is plugged into the USB Type-C receptacle 100, a metal tab inside the USB Type-C plug 200 is squeezed by a metal tongue (e.g., the metal tongue 310 or the metal tongue 320) of the USB Type-C receptacle 100, so that the metal tab inside the USB Type-C plug 200 makes tight contact with the metal tongue of the USB Type-C receptacle 100. When the USB Type-C receptacle 100 is pulled out of the USB Type-C plug 200, the metal tongue (e.g., the metal tongue 310 or the metal tongue 320) of the USB Type-C receptacle 100 leaves the metal tab inside the USB Type-C plug 200, so that the metal tab inside the USB Type-C plug 200 is disconnected from the metal tongue of the USB Type-C receptacle 100.

Hence it is highly desirable to improve the technique for USB connectors.

BRIEF SUMMARY OF THE INVENTION

Certain embodiments of the present invention are directed to electronic devices and/or circuits. More particularly, some embodiments of the invention provide USB receptacles and related controllers. Merely by way of example, some embodiments of the invention have been applied to USB Type-C. But it would be recognized that the invention has a much broader range of applicability.

According to some embodiments, a USB Type-C connector includes: a GND pin including a first metal tongue; a VBUS pin including a second metal tongue; a CC1 pin including a third metal tongue; and a CC2 pin including a fourth metal tongue; wherein: each metal tongue of the first metal tongue and the second metal tongue has a first predetermined length; and each metal tongue of the third metal tongue and the fourth metal tongue has a second predetermined length; wherein the first predetermined length is larger than the second predetermined length.

According to certain embodiments, a controller for one or more USB connectors includes: a first controller terminal configured to receive a first signal from a first pin of a first USB connector; a second controller terminal configured to receive a second signal from a second pin of the first USB connector; a third controller terminal configured to be connected directly or indirectly to a third pin of the first USB connector; and a fourth controller terminal configured to output a drive signal to a first transistor terminal of a transistor, the transistor further including a second transistor terminal and a third transistor terminal, the second transistor terminal being biased to a supply voltage, the third transistor terminal being connected to the third pin of the first USB connector; wherein the controller is configured to: process information associated with the first signal and the second signal; and determine, based at least in part on the first signal and the second signal, whether the first pin and the second pin of the first USB connector become disconnected from corresponding pins of a second USB connector; wherein the controller is further configured to, if the first pin and the second pin of the first USB connector become disconnected from the corresponding pins of the second USB connector: change the drive signal to turn off the transistor before the third pin of the first USB connector becomes disconnected from a corresponding pin of the second USB connector; and discharge the third pin of the first USB connector through the third controller terminal to reduce a pin voltage of the third pin of the first USB connector from the supply voltage to a voltage level before the third pin of the first USB connector becomes disconnected from the corresponding pin of the second USB connector; wherein the voltage level is smaller than the supply voltage.

According to some embodiments, a USB controller for one or more USB connectors includes: a detector configured to receive a first input signal from a first pin of a first USB connector and receive a second input signal from a second pin of the first USB connector and generate a detection signal based at least in part on the first input signal and the second input signal; a logic controller configured to receive the detection signal and generate a first control signal and a second control signal based at least in part on the detection signal; a driver configured to receive the first control signal, generate a drive signal based at least in part on the first control signal, and output the drive signal to a first transistor terminal of a transistor, the transistor further including a second transistor terminal and a third transistor terminal, the second transistor terminal being biased to a supply voltage, the third transistor terminal being connected to a third pin of the first USB connector; and a discharger configured to receive the second control signal, the discharger being further configured to be connected to the third pin of the first USB connector; wherein the detector is further configured to: determine, based at least in part on the first input signal and the second input signal, whether the first pin and the second pin of the first USB connector become disconnected from corresponding pins of a second USB connector; and generate the detection signal to indicate whether the first pin and the second pin of the first USB connector become disconnected from the corresponding pins of the second USB connector; wherein the logic controller is further configured to, if the detection signal indicates that the first pin and the second pin of the first USB connector become disconnected from the corresponding pins of the second USB connector: output the first control signal to the driver to change the drive signal to turn off the transistor before the third pin of the first USB connector becomes disconnected from a corresponding pin of the second USB connector; and output the second control signal to the discharger to discharge the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage.

According to certain embodiments, a method for one or more USB connectors includes: receiving a first signal from a first pin of a first USB connector; receiving a second signal from a second pin of the first USB connector; generating a drive signal based at least in part on the first control signal and the second control signal; processing information associated with the first signal and the second signal; determining, based at least in part on the first signal and the second signal, whether the first pin and the second pin of the first USB connector become disconnected from corresponding pins of a second USB connector; and if the first pin and the second pin of the first USB connector become disconnected from the corresponding pins of the second USB connector: outputting the drive signal to a first transistor terminal of a transistor to turn off the transistor before a third pin of the first USB connector becomes disconnected from a corresponding pin of the second USB connector, the transistor further including a second transistor terminal and a third transistor terminal, the second transistor terminal being biased to a supply voltage, the third transistor terminal being connected to the third pin of the first USB connector; and discharging the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage.

According to some embodiments, a method for one or more USB connectors includes: receiving a first input signal from a first pin of a first USB connector; receiving a second input signal from a second pin of the first USB connector; determining, based at least in part on the first input signal and the second input signal, whether the first pin and the second pin of the first USB connector become disconnected from corresponding pins of a second USB connector; generating a detection signal to indicate whether the first pin and the second pin of the first USB connector become disconnected from the corresponding pins of the second USB connector; receiving the detection signal; and if the detection signal indicates that the first pin and the second pin of the first USB connector become disconnected from the corresponding pins of the second USB connector: generating a first control signal and a second control signal based at least in part on the detection signal; outputting, based at least in part on the first control signal, the drive signal to a first transistor terminal of a transistor to turn off the transistor before a third pin of the first USB connector becomes disconnected from a corresponding pin of the second USB connector, the transistor further including a second transistor terminal and a third transistor terminal, the second transistor terminal being biased to a supply voltage, the third transistor terminal being connected to the third pin of the first USB connector; and discharging, based at least in part on the second control signal, the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 2 is a simplified diagram showing a conventional pin distribution of a USB Type-C plug.

DETAILED DESCRIPTION OF THE INVENTION

Certain embodiments of the present invention are directed to electronic devices and/or circuits. More particularly, some embodiments of the invention provide USB receptacles and related controllers. Merely by way of example, some embodiments of the invention have been applied to USB Type-C. But it would be recognized that the invention has a much broader range of applicability.

Figure 1:
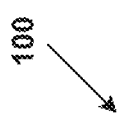
FIG. 1 is a simplified diagram showing a conventional pin distribution of a USB Type-C receptacle.
Figure 2:
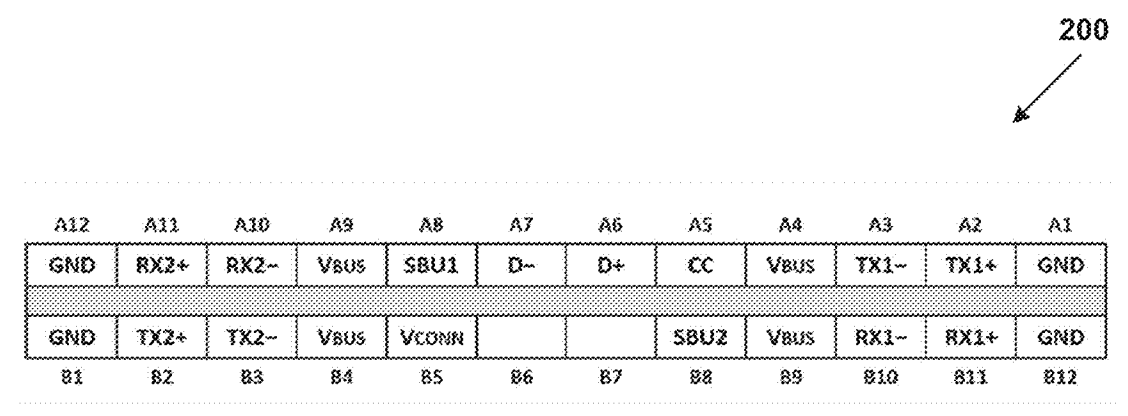
Figure 3:
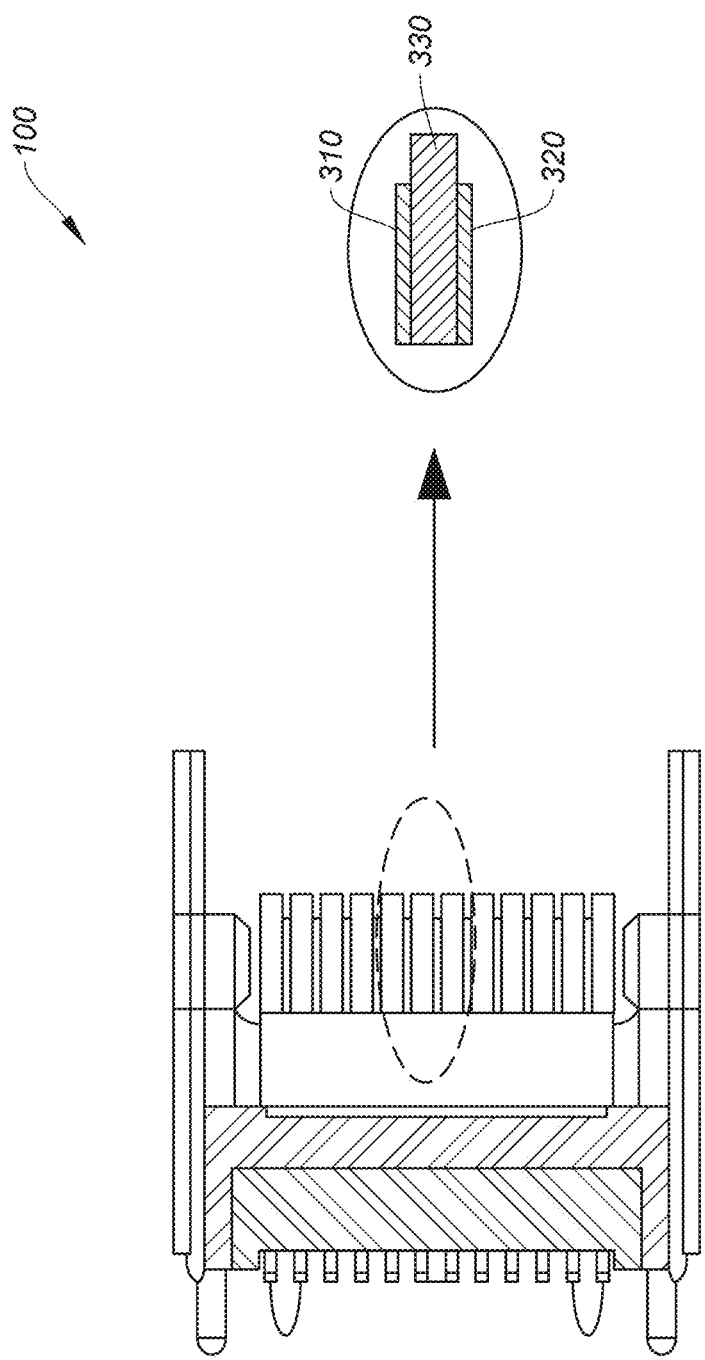
FIG. 3 is a simplified diagram showing conventional metal tongues inside the USB Type-C receptacle as shown in FIG. 1.
Figure 4:
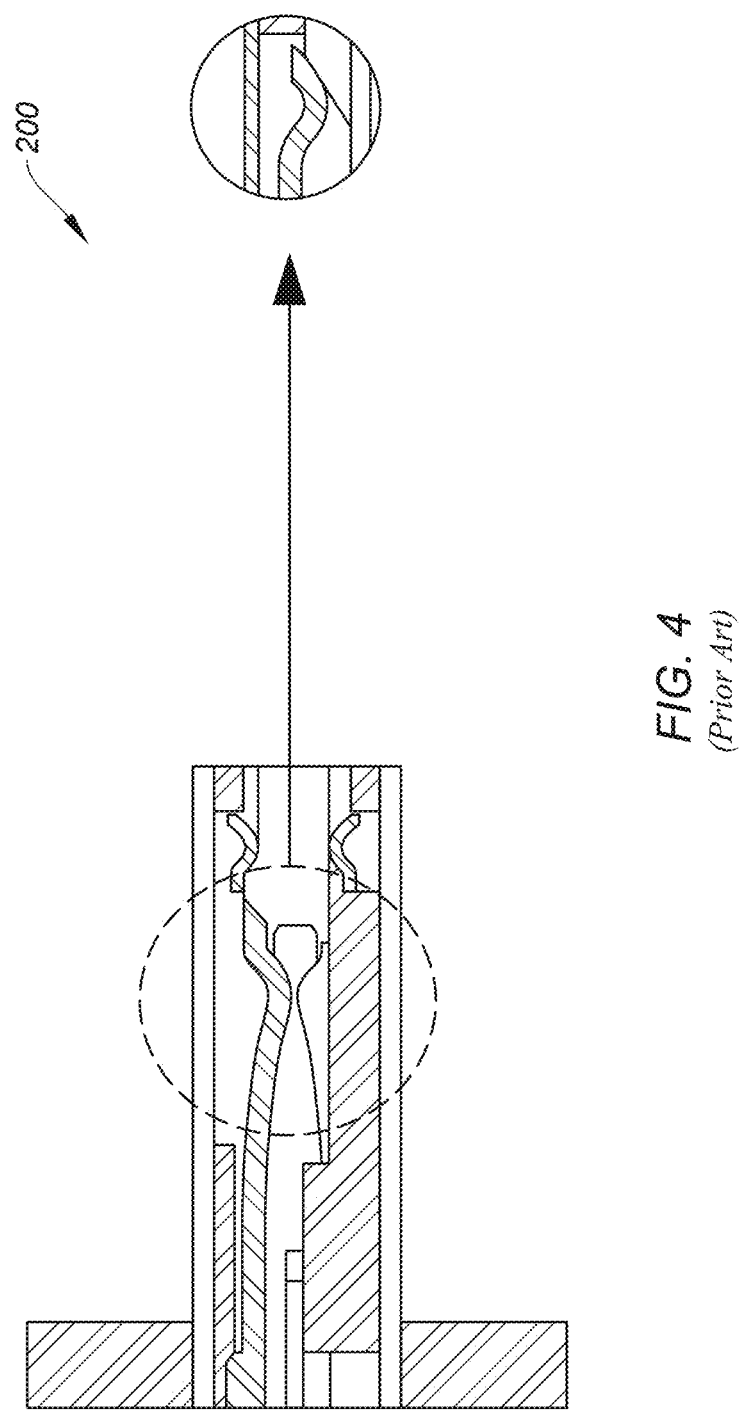
FIG. 4 is a simplified diagram showing one or more conventional metal tabs inside the USB Type-C plug as shown in FIG. 2.

As shown in FIG. 1 and FIG. 2, the USB Type-C receptacle 100 and the USB Type-C plug 200 form a USB Type-C charging interface according to certain embodiments. For example, the USB Type-C charging interface has a maximum charging voltage of 48 volts and a maximum charging current of 5 amps. As an example, during a hot swap, the voltage and/or the current at the one or more VBUS pins and the one or more GND pins are large and the internal spacing between a VBUS pin and a GND pin is small, so the electric arcing between a VBUS pin and a GND pin of the USB Type-C interface occurs. In some examples, the electric arcing can occur when the USB Type-C plug is unplugged from the USB Type-C receptacle if the voltage difference across the gap between the corresponding VBUS pins of the USB Type-C plug and the USB Type-C receptacle is greater than a voltage threshold. In certain examples, the electric arcing causes the deterioration of the USB Type-C charging interface and significantly shortens the service life of the USB Type-C charging interface.

Figure 5:
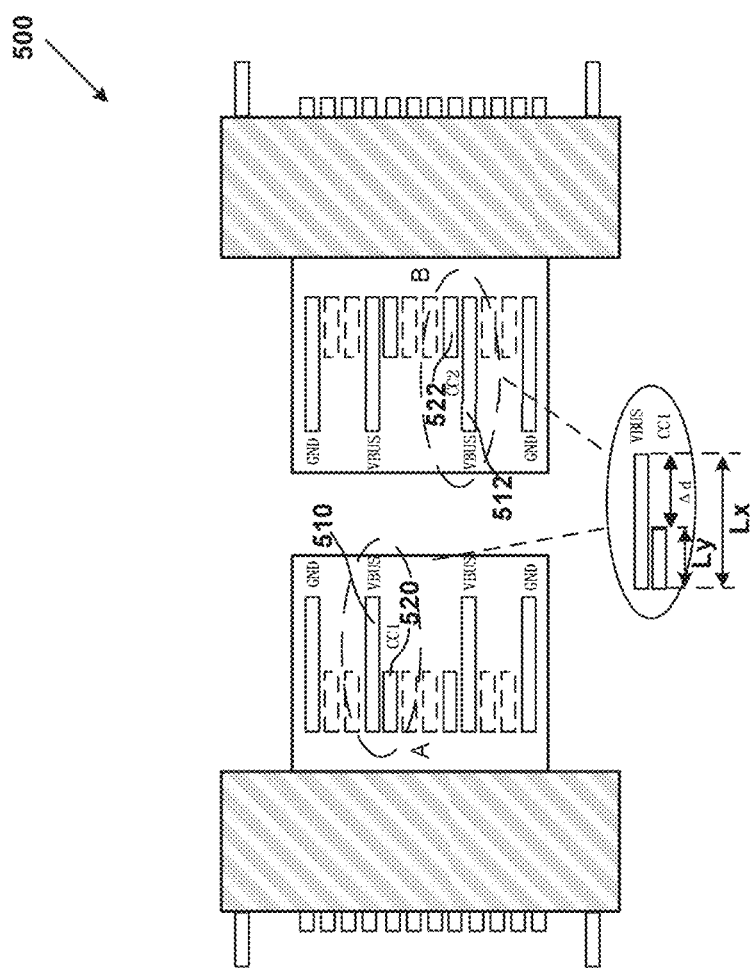
FIG. 5 is a simplified diagram showing a USB Type-C receptacle according to certain embodiments of the present invention.

FIG. 5 is a simplified diagram showing a USB Type-C receptacle according to certain embodiments of the present invention. This diagram is merely an example, which should not unduly limit the scope of the claims. One of ordinary skill in the art would recognize many variations, alternatives, and modifications.

According to some embodiments, the USB Type-C receptacle 500 includes twenty four pins, which are numbered from A1 through A12 and from B1 through B12. For example, the A5 pin is the CC1 pin, and the B5 pin is the CC2 pin. As an example, each of the A1 pin, the A12 pin, the B1 pin, and the B12 pin is a GND pin. For example, each of the A4 pin, the A9 pin, the B4 pin, and the B9 pin is a VBUS pin.

In certain embodiments, the A4 pin (e.g., a VBUS pin) includes a metal tongue 510, and the A5 pin (e.g., a CC1 pin) includes a metal tongue 520. For example, the metal tongue 510 of the A4 pin (e.g., a VBUS pin) has a length $L_x$, and the metal tongue 520 of the A5 pin (e.g., a CC1 pin) has a length $L_y$. As an example, the length $L_x$ is longer than the length $L_y$, and the length $L_x$ minus the length $L_y$ is equal to $\Delta d$.

In some embodiments, the B4 pin (e.g., a VBUS pin) includes a metal tongue 512, and the B5 pin (e.g., a CC2 pin) includes a metal tongue 522. For example, the metal tongue 512 of the B4 pin (e.g., a VBUS pin) has the length $L_x$, and the metal tongue 522 of the B5 pin (e.g., a CC2 pin) has the length $L_y$. As an example, the length $L_x$ is longer than the length $L_y$, and the length $L_x$ minus the length $L_y$ is equal to $\Delta d$.

In certain examples, all of the VBUS pins (e.g., the A4 pin, the A9 pin, the B4 pin, and the B9 pin) have metal tongues of the same length, and each of the VBUS pins (e.g., the A4 pin, the A9 pin, the B4 pin, and the B9 pin) has a metal tongue of the length $L_x$. In some examples, all of the GND pins (e.g., the A1 pin, the A12 pin, the B1 pin, and the B12 pin) have metal tongues of the same length, and each of the GND pins (e.g., the A1 pin, the A12 pin, the B1 pin, and the B12 pin) has a metal tongue of the length $L_x$.

According to some embodiments, the CC1 pin (e.g., the A5 pin) and the CC2 pin (e.g., the B5 pin) have metal tongues of the same length, and each of the CC1 pin (e.g., the A5 pin) and the CC2 pin (e.g., the B5 pin) has a metal tongue of the length $L_y$. For example, the length $L_x$ is longer than the length $L_y$, and the length $L_x$ minus the length $L_y$ is equal to $\Delta d$.

According to certain embodiments, the twenty four pins of the USB Type-C receptacle 500 include sixteen pins that are not GND pins and are not VBUS pins. For example, among these sixteen pins, the A5 pin is the CC1 pin, and the B5 pin is the CC2 pin. As an example, these sixteen pins include sixteen corresponding metal tongues respectively, and each metal tongue of these sixteen metal tongues has the length $L_y$.

Figure 6:
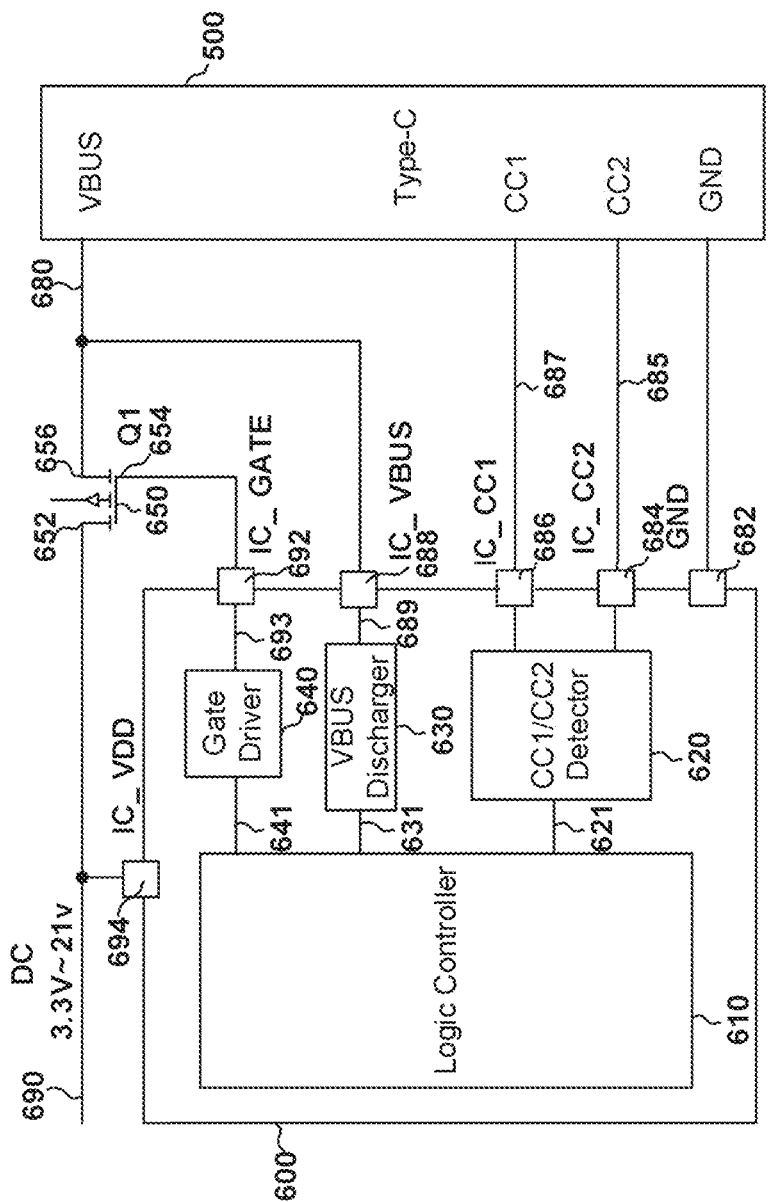
FIG. 6 is a simplified diagram showing a controller for the USB Type-C receptacle as shown in FIG. 5 according to some embodiments of the present invention.

FIG. 6 is a simplified diagram showing a controller for the USB Type-C receptacle 500 as shown in FIG. 5 according to some embodiments of the present invention. This diagram is merely an example, which should not unduly limit the scope of the claims. One of ordinary skill in the art would recognize many variations, alternatives, and modifications. The controller 600 for the USB Type-C receptacle 500 includes terminals 682, 684, 686, 688, 692, and 694. Additionally, the controller 600 for the USB Type-C receptacle 500 includes a logic controller 610, a CC1/CC2 detector 620, a VBUS discharger 630, and a gate driver 640. For example, the controller 600 is a chip that includes the pins 682, 684, 686, 688, 692, and 694. As an example, the terminal 682 is the GND pin, the terminal 684 is the IC_CC2 pin, the terminal 686 is the IC_CC1 pin, the terminal 688 is the IC_VBUS pin, the terminal 692 is the IC_GATE pin, and the terminal 694 is the IC_VDD pin. Although the above has been shown using a selected group of components for the controller 600 (e.g., a USB controller), there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the CC1/CC2 detector 620 is connected to the terminal 684 and the terminal 686, the VBUS discharger 630 is connected to the terminal 688, and the gate driver 640 is connected to the terminal 692. In some embodiments, the terminal 682 is connected to the GND pins (e.g., the A1 pin, the A12 pin, the B1 pin, and the B12 pin) of the USB Type-C receptacle 500, and the terminal 688 is connected to the VBUS pins (e.g., the A4 pin, the A9 pin, the B4 pin, and the B9 pin) of the USB Type-C receptacle 500. For example, the terminal 684 is connected to the CC2 pin (e.g., the B5 pin) of the USB Type-C receptacle 500. As an example, the terminal 686 is connected to the CC1 pin (e.g., the A5 pin) of the USB Type-C receptacle 500.

According to certain embodiments, a transistor 650 includes a drain terminal 652, a gate terminal 654, and a source terminal 656. For example, the drain terminal 652 receives a supply voltage 690. As an example, the supply voltage 690 is larger than or equal to 3.3 volts and smaller than or equal to 21 volts. For example, the gate terminal 654 is connected to the terminal 692 of the controller 600. In some examples, the source terminal 656 is connected to the VBUS pins (e.g., the A4 pin, the A9 pin, the B4 pin, and the B9 pin) of the USB Type-C receptacle 500. In certain examples, the terminal 694 of the controller 600 receives the supply voltage 690.

According to some embodiments, the CC1/CC2 detector 620 is connected to the CC2 pin (e.g., the B5 pin) of the USB Type-C receptacle 500 through the terminal 684 and is connected to the CC1 pin (e.g., the A5 pin) of the USB Type-C receptacle 500 through the terminal 686. For example, the CC1/CC2 detector 620 receives a signal 685 from the CC2 pin (e.g., the B5 pin) of the USB Type-C receptacle 500 and receives a signal 687 from the CC1 pin (e.g., the A5 pin) of the USB Type-C receptacle 500. In certain examples, the CC1/CC2 detector 620 processes the signals 685 and 687, and determines whether the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200). For example, for the CC2 pin (e.g., the B5 pin) of the USB Type-C receptacle 500, the corresponding pin is the VCONN pin (e.g., the B5 pin) of the USB Type-C plug 200. As an example, for the CC1 pin (e.g., the A5 pin) of the USB Type-C receptacle 500, the corresponding pin is the CC pin (e.g., the A5 pin) of the USB Type-C plug 200. In some examples, the CC1/CC2 detector 620 generates a detection signal 621 based at least in part on the signals 685 and 687. For example, the detection signal 621 indicates whether the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200). In certain embodiments, the logic controller 610 receives the detection signal 621 and generates control signals 631 and 641 based at least in part on the detection signal 621. For example, the control signal 631 is received and processed by the VBUS discharger 630. As an example, the control signal 641 is received and processed by the gate driver 640.

In certain embodiments, the gate driver 640 receives the control signal 641, processes information associated with the control signal 641, and generates a drive signal 693 based at least in part on the control signal 641. For example, the drive signal 693 is received by the gate terminal 654 of the transistor 650. As an example, the drive signal 693 is used to turn on and/or turn off the transistor 650. In some embodiments, the VBUS discharger 630 receives the control signal 631, processes information associated with the control signal 631, and generates a discharge signal 689 based at least in part on the control signal 631. For example, the discharge signal 689 is received by the VBUS pins (e.g., the A4 pin, the A9 pin, the B4 pin, and the B9 pin) of the USB Type-C receptacle 500. As an example, the discharge signal 689 is used to discharge the VBUS pins (e.g., the A4 pin, the A9 pin, the B4 pin, and the B9 pin) of the USB Type-C receptacle 500. For example, the discharge signal 689 is an output voltage of the VBUS discharger 630.

According to certain embodiments, if the detection signal 621 indicates that the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200), the drive signal 693 turns off the transistor 650, and the VBUS discharger 630 discharges the VBUS pins (e.g., the A4 pin, the A9 pin, the B4 pin, and the B9 pin) of the USB Type-C receptacle 500 through the terminal 688 of the controller 600. According to some embodiments, if the detection signal 621 does not indicate that the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200), the drive signal 693 does not turn off the transistor 650, and the VBUS discharger 630 does not discharge the VBUS pins (e.g., the A4 pin, the A9 pin, the B4 pin, and the B9 pin) of the USB Type-C receptacle 500.

As shown in FIG. 5, for the USB Type-C receptacle 500, each of the GND pins (e.g., the A1 pin, the A12 pin, the B1 pin, and the B12 pin) has a metal tongue of the length $L_x$, and each of the VBUS pins (e.g., the A4 pin, the A9 pin, the B4 pin, and the B9 pin) has a metal tongue of the length $L_x$ according to some embodiments. In certain examples, for the USB Type-C receptacle 500, each of the CC1 pin (e.g., the A5 pin) and the CC2 pin (e.g., the B5 pin) has a metal tongue of the length $L_y$. In some examples, the length $L_x$ is longer than the length $L_y$.

According to certain embodiments, when the USB Type-C receptacle 500 becomes disconnected from the USB Type-C plug (e.g., the USB Type-C plug 200), the CC2 pin (e.g., the B5 pin) of the USB Type-C receptacle 500 becomes disconnected from the VCONN pin (e.g., the B5 pin) of the USB Type-C plug (e.g., the USB Type-C plug 200) and the CC1 pin (e.g., the A5 pin) of the USB Type-C receptacle 500 become disconnected from the CC pin (e.g., the A5 pin) of the USB Type-C plug (e.g., the USB Type-C plug 200) before the VBUS pins (e.g., the A4 pin, the A9 pin, the B4 pin, and the B9 pin) of the USB Type-C receptacle 500 become disconnected from their corresponding VBUS pins of the USB Type-C plug (e.g., the USB Type-C plug 200). For example, the A4 pin (e.g., the VBUS pin) of the USB Type-C receptacle 500 corresponds to the A4 pin (e.g., the VBUS pin) of the USB Type-C plug (e.g., the USB Type-C plug 200). As an example, the A9 pin (e.g., the VBUS pin) of the USB Type-C receptacle 500 corresponds to the A9 pin (e.g., the VBUS pin) of the USB Type-C plug (e.g., the USB Type-C plug 200). For example, the B4 pin (e.g., the VBUS pin) of the USB Type-C receptacle 500 corresponds to the B4 pin (e.g., the VBUS pin) of the USB Type-C plug (e.g., the USB Type-C plug 200). As an example, the B9 pin (e.g., the VBUS pin) of the USB Type-C receptacle 500 corresponds to the B9 pin (e.g., the VBUS pin) of the USB Type-C plug (e.g., the USB Type-C plug 200).

In some examples, when the USB Type-C receptacle 500 becomes disconnected from the USB Type-C plug (e.g., the USB Type-C plug 200), during a delay time duration (e.g., $\Delta t$), the CC2 pin (e.g., the B5 pin) of the USB Type-C receptacle 500 is disconnected from the VCONN pin (e.g., the B5 pin) of the USB Type-C plug (e.g., the USB Type-C plug 200) and the CC1 pin (e.g., the A5 pin) of the USB Type-C receptacle 500 is disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200). In certain examples, during the delay time duration (e.g., Δt), the VBUS pins (e.g., the A4 pin, the A9 pin, the B4 pin, and the B9 pin) of the USB Type-C receptacle 500 are discharged by the VBUS discharger 630. For example, at the end of the delay time duration (e.g., Δt), a voltage 680 of the VBUS pins (e.g., the A4 pin, the A9 pin, the B4 pin, and the B9 pin) of the USB Type-C receptacle 500 has decreased significantly to a lower magnitude (e.g., to zero volts) before the VBUS pins (e.g., the A4 pin, the A9 pin, the B4 pin, and the B9 pin) of the USB Type-C receptacle 500 become disconnected from their corresponding VBUS pins of the USB Type-C plug (e.g., the USB Type-C plug 200).

In some embodiments, the CC1/CC2 detector 620 detects whether the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200). For example, the detection performed by the CC1/CC2 detector 620 uses the detection of a high voltage level and/or a low voltage level. As an example, the detection performed by the CC1/CC2 detector 620 uses the impedance detection. In certain embodiments, the transistor 650 is used to control the connection of the VBUS pins (e.g., the A4 pin, the A9 pin, the B4 pin, and the B9 pin) of the USB Type-C receptacle 500 to the voltage source of the supply voltage 690. In some examples, if the transistor 650 is turned on, the VBUS pins (e.g., the A4 pin, the A9 pin, the B4 pin, and the B9 pin) of the USB Type-C receptacle 500 is connected to the voltage source of the supply voltage 690, and the voltage 680 of the VBUS pins (e.g., the A4 pin, the A9 pin, the B4 pin, and the B9 pin) of the USB Type-C receptacle 500 is biased to the supply voltage 690. In certain examples, if the transistor 650 is turned off, the VBUS pins (e.g., the A4 pin, the A9 pin, the B4 pin, and the B9 pin) of the USB Type-C receptacle 500 is not connected to the voltage source of the supply voltage 690, and the voltage 680 of the VBUS pins (e.g., the A4 pin, the A9 pin, the B4 pin, and the B9 pin) of the USB Type-C receptacle 500 decreases from the supply voltage 690 during a discharging process. For example, the transistor 650 includes an NMOS transistor. As an example, the transistor 650 includes a PMOS transistor. For example, the transistor 650 includes common-source back-to-back MOSFETS. As an example, the transistor 650 includes common-drain back-to-back MOSFETS. In some embodiments, in response to the control signal 631, the VBUS discharger 630 discharges the VBUS pins (e.g., the A4 pin, the A9 pin, the B4 pin, and the B9 pin) of the USB Type-C receptacle 500. For example, the discharging process uses a constant-voltage discharge. As an example, the discharging process uses a constant-current discharge. For example, the discharging process uses a constant-impedance discharge.

Figure 7:
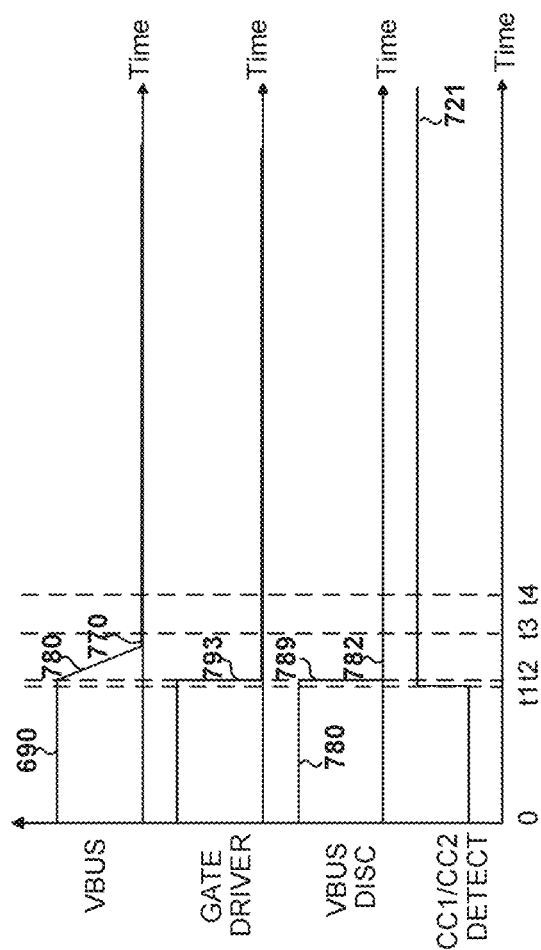
FIG. 7 shows simplified timing diagrams for the controller as shown in FIG. 6 for the USB Type-C receptacle as shown in FIG. 5 according to certain embodiments of the present invention.

FIG. 7 shows simplified timing diagrams for the controller 600 as shown in FIG. 6 for the USB Type-C receptacle 500 as shown in FIG. 5 according to certain embodiments of the present invention. These diagrams are merely examples, which should not unduly limit the scope of the claims. One of ordinary skill in the art would recognize many variations, alternatives, and modifications. The waveform 780 represents the voltage 680 of the VBUS pins (e.g., the A4 pin, the A9 pin, the B4 pin, and the B9 pin) of the USB Type-C receptacle 500 as a function of time, the waveform 793 represents the drive signal 693 as a function of time, the waveform 789 represents the discharge signal 689 as a function of time, and the waveform 721 represents the detection signal 621 as a function of time.

From time $t_0$ to time $t_1$, the USB Type-C receptacle 500 is connected to a USB Type-C plug (e.g., the USB Type-C plug 200) according to some embodiments. In certain examples, from time $t_0$ to time $t_1$, the CC2 pin (e.g., the B5 pin) of the USB Type-C receptacle 500 remains connected to the VCONN pin (e.g., the B5 pin) of the USB Type-C plug (e.g., the USB Type-C plug 200), the CC1 pin (e.g., the A5 pin) of the USB Type-C receptacle 500 remains connected to the CC pin (e.g., the A5 pin) of the USB Type-C plug (e.g., the USB Type-C plug 200), and the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

For example, as shown by the waveform 780, from time $t_0$ to time $t_1$, the voltage 680 of the VBUS pins (e.g., the A4 pin, the A9 pin, the B4 pin, and the B9 pin) of the USB Type-C receptacle 500 remains equal to the supply voltage 690. As an example, as shown by the waveform 793, from time $t_0$ to time $t_1$, the drive signal 693 remains at a logic high level to keep the transistor 650 turned on. For example, as shown by the waveform 789, from time $t_0$ to time $t_1$, the discharge signal 689 (e.g., the output voltage of the VBUS discharger 630) remains at a voltage level 780 that does not discharge the VBUS pins (e.g., the A4 pin, the A9 pin, the B4 pin, and the B9 pin) of the USB Type-C receptacle 500. As an example, as shown by the waveform 721, from time $t_0$ to time $t_1$, the detection signal 621 remains at the logic low level to indicate that the CC2 pin (e.g., the B5 pin) and/or the CC1 pin (e.g., the A5 pin) of the USB Type-C receptacle 500 remain connected to their corresponding pins of the USB Type-C plug (e.g., the USB Type-C plug 200).

At time $t_1$, the USB Type-C receptacle 500 starts becoming disconnected from the USB Type-C plug (e.g., the USB Type-C plug 200) according to certain embodiments. In some examples, at time $t_1$, the CC2 pin (e.g., the B5 pin) of the USB Type-C receptacle 500 becomes disconnected from the VCONN pin (e.g., the B5 pin) of the USB Type-C plug (e.g., the USB Type-C plug 200), and the CC1 pin (e.g., the A5 pin) of the USB Type-C receptacle 500 becomes disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, at time $t_1$, the detection signal 621 changes from the logic low level to the logic high level to indicate that the CC2 pin (e.g., the B5 pin) and the CC1 pin (e.g., the A5 pin) of the USB Type-C receptacle 500 become disconnected from their corresponding pins of the USB Type-C plug (e.g., the USB Type-C plug 200). For example, as shown by the waveform 780, at time $t_1$, the voltage 680 of the VBUS pins (e.g., the A4 pin, the A9 pin, the B4 pin, and the B9 pin) of the USB Type-C receptacle 500 remains equal to the supply voltage 690. As an example, as shown by the waveform 793, at time $t_1$, the drive signal 693 remains at the logic high level to keep the transistor 650 turned on. For example, as shown by the waveform 789, at time $t_1$, the discharge signal 689 (e.g., the output voltage of the VBUS discharger 630) remains at the voltage level 780 that does not discharge the VBUS pins (e.g., the A4 pin, the A9 pin, the B4 pin, and the B9 pin) of the USB Type-C receptacle 500.

From time $t_1$ to time $t_2$, the USB Type-C receptacle 500 is in the process of becoming disconnected from the USB Type-C plug (e.g., the USB Type-C plug 200) according to some embodiments. In certain examples, from time $t_1$ to time $t_2$, the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, from time $t_1$ to time $t_2$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, from time $t_1$ to time $t_2$, the voltage 680 of the VBUS pins (e.g., the A4 pin, the A9 pin, the B4 pin, and the B9 pin) of the USB Type-C receptacle 500 remains equal to the supply voltage 690. As an example, as shown by the waveform 793, from time $t_1$ to time $t_2$, the drive signal 693 remains at the logic high level to keep the transistor 650 turned on. For example, as shown by the waveform 789, from time $t_1$ to time $t_2$, the discharge signal 689 (e.g., the output voltage of the VBUS discharger 630) remains at the voltage level 780 that does not discharge the VBUS pins (e.g., the A4 pin, the A9 pin, the B4 pin, and the B9 pin) of the USB Type-C receptacle 500.

At time $t_2$, the USB Type-C receptacle 500 is in the process of becoming disconnected from the USB Type-C plug (e.g., the USB Type-C plug 200) according to certain embodiments. In some examples, at time $t_2$, the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, at time $t_2$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, at time $t_2$, the voltage 680 of the VBUS pins (e.g., the A4 pin, the A9 pin, the B4 pin, and the B9 pin) of the USB Type-C receptacle 500 starts decreasing from the supply voltage 690. As an example, as shown by the waveform 793, at time $t_2$, the drive signal 693 changes from the logic high level to the logic low level to turn off the transistor 650. For example, as shown by the waveform 789, at time $t_2$, the discharge signal 689 (e.g., the output voltage of the VBUS discharger 630) drops from the voltage level 780 to a voltage level 782 in order to discharge the VBUS pins (e.g., the A4 pin, the A9 pin, the B4 pin, and the B9 pin) of the USB Type-C receptacle 500.

From time $t_2$ to time $t_3$, the USB Type-C receptacle 500 is in the process of becoming disconnected from the USB Type-C plug (e.g., the USB Type-C plug 200) according to some embodiments. In certain examples, from time $t_2$ to time $t_3$, the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, from time $t_2$ to time $t_3$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, from time $t_2$ to time $t_3$, the voltage 680 of the VBUS pins (e.g., the A4 pin, the A9 pin, the B4 pin, and the B9 pin) of the USB Type-C receptacle 500 decreases from the supply voltage 690 to a voltage level 770 (e.g., 0 volts). As an example, as shown by the waveform 793, from time $t_2$ to time $t_3$, the drive signal 693 remains at the logic low level to keep the transistor 650 turned off. For example, as shown by the waveform 789, from time $t_2$ to time $t_3$, the discharge signal 689 (e.g., the output voltage of the VBUS discharger 630) remains at the voltage level 782 to discharge the VBUS pins (e.g., the A4 pin, the A9 pin, the B4 pin, and the B9 pin) of the USB Type-C receptacle 500. At time $t_3$, the USB Type-C receptacle 500 is in the process of becoming disconnected from the USB Type-C plug (e.g., the USB Type-C plug 200) according to some embodiments. In certain examples, at time $t_3$, the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, at time $t_3$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, at time $t_3$, the voltage 680 of the VBUS pins (e.g., the A4 pin, the A9 pin, the B4 pin, and the B9 pin) of the USB Type-C receptacle 500 is equal to the voltage level 770 (e.g., 0 volts). As an example, as shown by the waveform 793, at time $t_3$, the drive signal 693 remains at the logic low level to keep the transistor 650 turned off. For example, as shown by the waveform 789, at time $t_3$, the discharge signal 689 (e.g., the output voltage of the VBUS discharger 630) remains at the voltage level 782.

From time $t_3$ to time $t_4$, the USB Type-C receptacle 500 is in the process of becoming disconnected from the USB Type-C plug (e.g., the USB Type-C plug 200) according to some embodiments. In certain examples, from time $t_3$ to time $t_4$, the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200).

As an example, as shown by the waveform 721, from time $t_3$ to time $t_4$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, from time $t_3$ to time $t_4$, the voltage 680 of the VBUS pins (e.g., the A4 pin, the A9 pin, the B4 pin, and the B9 pin) of the USB Type-C receptacle 500 remains equal to the voltage level 770 (e.g., 0 volts). As an example, as shown by the waveform 793, from time $t_3$ to time $t_4$, the drive signal 693 remains at the logic low level to keep the transistor 650 turned off. For example, as shown by the waveform 789, from time $t_3$ to time $t_4$, the discharge signal 689 (e.g., the output voltage of the VBUS discharger 630) remains at the voltage level 782.

At time $t_4$, the USB Type-C receptacle 500 becomes disconnected from the USB Type-C plug (e.g., the USB Type-C plug 200) according to certain embodiments. In some examples, at time $t_4$, the VBUS pins (e.g., the A4 pin, the A9 pin, the B4 pin, and the B9 pin) of the USB Type-C receptacle 500 become disconnected from their corresponding VBUS pins of the USB Type-C plug (e.g., the USB Type-C plug 200), while the CC2 pin (e.g., the B5 pin) of the USB Type-C receptacle 500 remains disconnected from the VCONN pin (e.g., the B5 pin) of the USB Type-C plug (e.g., the USB Type-C plug 200), and the CC1 pin (e.g., the A5 pin) of the USB Type-C receptacle 500 remains disconnected from the CC pin (e.g., the A5 pin) of the USB Type-C plug (e.g., the USB Type-C plug 200). In certain examples, time $t_4$ is equal to time $t_1$ plus the delay time duration $\Delta t$. As an example, during the delay time duration $\Delta t$, the CC2 pin (e.g., the B5 pin) of the USB Type-C receptacle 500 is disconnected from the VCONN pin (e.g., the B5 pin) of the USB Type-C plug (e.g., the USB Type-C plug 200) and the CC1 pin (e.g., the A5 pin) of the USB Type-C receptacle 500 is disconnected from the CC pin (e.g., the A5 pin) of the USB Type-C plug (e.g., the USB Type-C plug 200), but the VBUS pins (e.g., the A4 pin, the A9 pin, the B4 pin, and the B9 pin) of the USB Type-C receptacle 500 remain connected to their corresponding VBUS pins of the USB Type-C plug (e.g., the USB Type-C plug 200). As an example, at time $t_4$ (e.g., at the end of the delay time duration $\Delta t$), the VBUS pins (e.g., the A4 pin, the A9 pin, the B4 pin, and the B9 pin) of the USB Type-C receptacle 500 become disconnected from their corresponding VBUS pins of the USB Type-C plug (e.g., the USB Type-C plug 200), while the CC2 pin (e.g., the B5 pin) of the USB Type-C receptacle 500 remains disconnected from the VCONN pin (e.g., the B5 pin) of the USB Type-C plug (e.g., the USB Type-C plug 200) and the CC1 pin (e.g., the A5 pin) of the USB Type-C receptacle 500 remains disconnected from the CC pin (e.g., the A5 pin) of the USB Type-C plug (e.g., the USB Type-C plug 200).

As an example, as shown by the waveform 721, at time $t_4$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, at time $t_4$, the voltage 680 of the VBUS pins (e.g., the A4 pin, the A9 pin, the B4 pin, and the B9 pin) of the USB Type-C receptacle 500 remains equal to the voltage level 770 (e.g., 0 volts). As an example, as shown by the waveform 793, at time $t_4$, the drive signal 693 remains at the logic low level to keep the transistor 650 turned off. For example, as shown by the waveform 789, at time $t_4$, the discharge signal 689 (e.g., the output voltage of the VBUS discharger 630) remains at the voltage level 782.

After time $t_4$, the USB Type-C receptacle 500 remains disconnected from the USB Type-C plug (e.g., the USB Type-C plug 200) according to some embodiments. In certain examples, after time $t_4$ (e.g., after the end of the delay time duration $\Delta t$), the VBUS pins (e.g., the A4 pin, the A9 pin, the B4 pin, and the B9 pin) of the USB Type-C receptacle 500 remain disconnected from their corresponding VBUS pins of the USB Type-C plug (e.g., the USB Type-C plug 200), while the CC2 pin (e.g., the B5 pin) of the USB Type-C receptacle 500 also remains disconnected from the VCONN pin (e.g., the B5 pin) of the USB Type-C plug (e.g., the USB Type-C plug 200), and the CC1 pin (e.g., the A5 pin) of the USB Type-C receptacle 500 also remains disconnected from the CC pin (e.g., the A5 pin) of the USB Type-C plug (e.g., the USB Type-C plug 200).

As an example, as shown by the waveform 721, after time $t_4$, the detection signal 621 remains at the logic high level to indicate that the CC2 pin (e.g., the B5 pin) and the CC1 pin (e.g., the A5 pin) of the USB Type-C receptacle 500 remain disconnected from their corresponding pins of the USB Type-C plug (e.g., the USB Type-C plug 200). For example, as shown by the waveform 780, after time $t_4$, the voltage 680 of the VBUS pins (e.g., the A4 pin, the A9 pin, the B4 pin, and the B9 pin) of the USB Type-C receptacle 500 remains equal to the voltage level 770 (e.g., 0 volts). As an example, as shown by the waveform 793, after time $t_4$, the drive signal 693 remains at the logic low level to keep the transistor 650 turned off. For example, as shown by the waveform 789, after time $t_4$, the discharge signal 689 (e.g., the output voltage of the VBUS discharger 630) remains at the voltage level 782.

Figure 8:
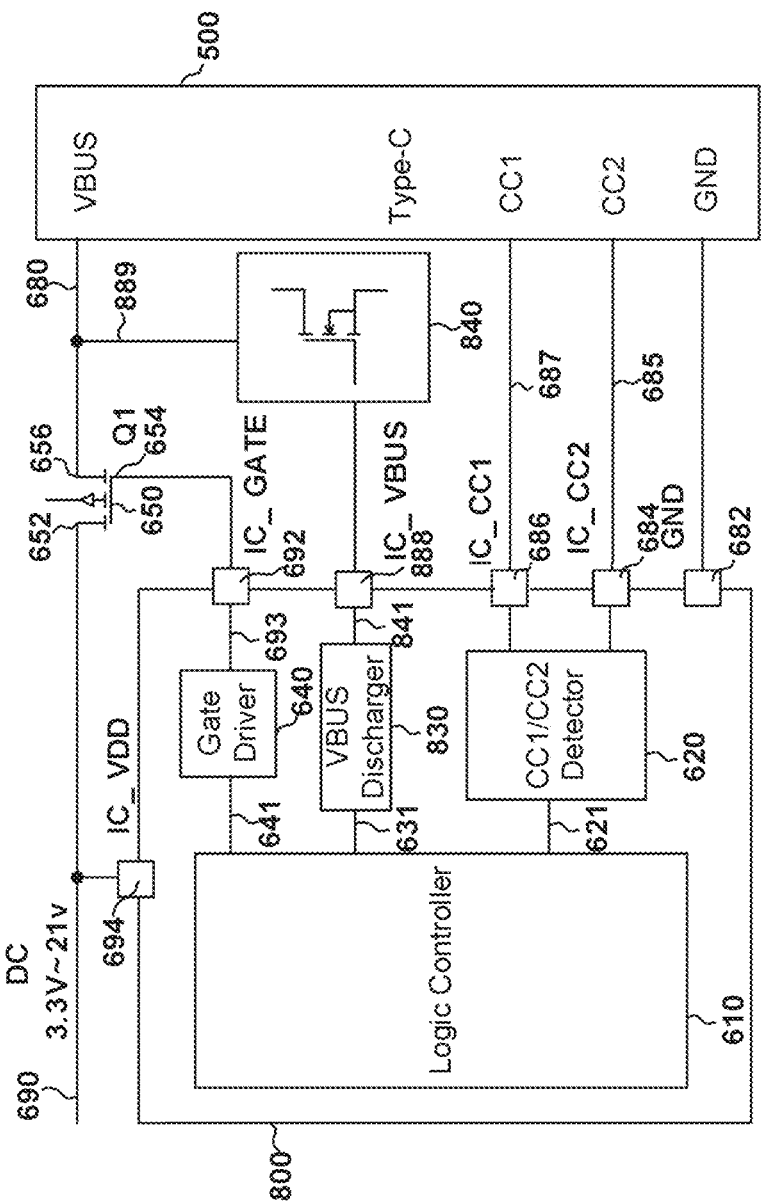
FIG. 8 is a simplified diagram showing a controller for the USB Type-C receptacle as shown in FIG. 5 according to some embodiments of the present invention.
Figure 9:
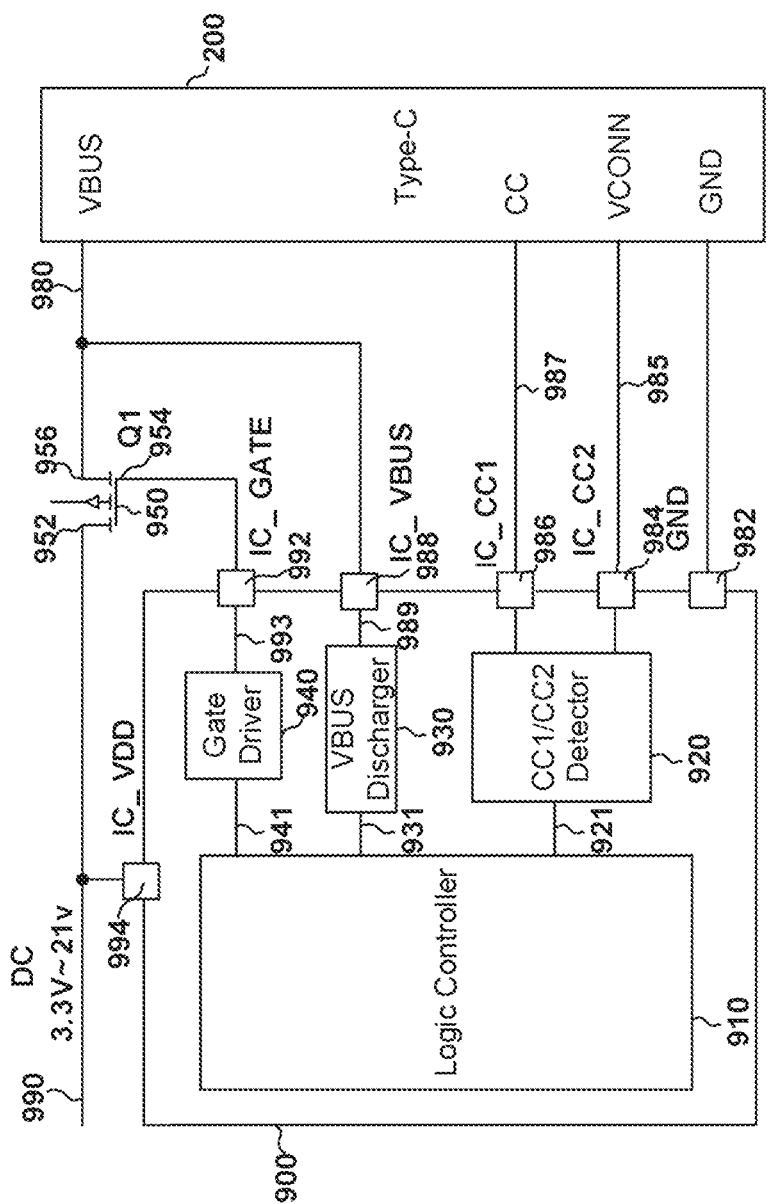
FIG. 9 is a simplified diagram showing a controller for the USB Type-C plug as shown in FIG. 2 that is being disconnected from the USB Type-C receptacle as shown in FIG. 5 according to some embodiments of the present invention.

As discussed above and further emphasized here, FIG. 6 is merely an example, which should not unduly limit the scope of the claims. One of ordinary skill in the art would recognize many variations, alternatives, and modifications. For example, the controller 600 for the USB Type-C receptacle 500 is modified by placing one or more components of the VBUS discharger 630 outside the chip 600 as shown in FIG. 8. As an example, the controller 600 works with a USB Type-C plug (e.g., the USB Type-C plug 200) that is being disconnected from the USB Type-C receptacle 500 as shown in FIG. 9.

FIG. 8 is a simplified diagram showing a controller for the USB Type-C receptacle 500 as shown in FIG. 5 according to some embodiments of the present invention. This diagram is merely an example, which should not unduly limit the scope of the claims. One of ordinary skill in the art would recognize many variations, alternatives, and modifications. The controller 800 for the USB Type-C receptacle 500 includes terminals 682, 684, 686, 888, 692, and 694. Additionally, the controller 800 for the USB Type-C receptacle 500 includes the logic controller 610, the CC1/CC2 detector 620, a VBUS discharger 830, and the gate driver 640. For example, the controller 800 is a chip that includes the pins 682, 684, 686, 888, 692, and 694. As an example, the terminal 682 is the GND pin, the terminal 684 is the IC_CC2 pin, the terminal 686 is the IC_CC1 pin, the terminal 888 is an IC_VBUS pin, the terminal 692 is the IC_GATE pin, and the terminal 694 is the IC_VDD pin. Although the above has been shown using a selected group of components for the controller 800 (e.g., a USB controller), there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the control signal 631 is received and processed by the VBUS discharger 830, and the VBUS discharger 830 is connected to the terminal 888. For example, the VBUS discharger 830 is connected to a discharging component 840 through the terminal 888. In some examples, the VBUS discharger 830 and the discharging component 840 together perform the same functions as the VBUS discharger 630 as shown in FIG. 6. For example, the discharging component 840 includes a MOSFET. As an example, the discharging component 840 includes a bipolar transistor. In some embodiments, the VBUS discharger 830 receives the control signal 631, processes information associated with the control signal 631, and generates a signal 841 based at least in part on the control signal 631. As an example, the signal 841 is received by the discharging component 840 through the terminal 888. For example, the discharging component 840 generates a discharge signal 889 based at least in part on the signal 841. As an example, the discharge signal 889 is an output voltage of the discharging component 840.

According to certain embodiments, if the detection signal 621 indicates that the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200), the drive signal 693 turns off the transistor 650, and the VBUS discharger 630 and the discharging component 840 discharge the VBUS pins (e.g., the A4 pin, the A9 pin, the B4 pin, and the B9 pin) of the USB Type-C receptacle 500 through the terminal 888 of the controller 800. According to some embodiments, if the detection signal 621 does not indicate that the CC2 pin (e.g., the B5 pin) and the CC1 pin (e.g., the A5 pin) of the USB Type-C receptacle 500 become disconnected from their corresponding pins of a USB Type-C plug (e.g., the USB Type-C plug 200), the drive signal 693 does not turn off the transistor 650, and the VBUS discharger 630 and the discharging component 840 do not discharge the VBUS pins (e.g., the A4 pin, the A9 pin, the B4 pin, and the B9 pin) of the USB Type-C receptacle 500.

As mentioned above and further emphasized here, FIG. 6 and FIG. 8 are merely examples, which should not unduly limit the scope of the claims. One of ordinary skill in the art would recognize many variations, alternatives, and modifications. For example, the combination of the VBUS discharger 830 and the discharging component 840 is the same as the VBUS discharger 630.

FIG. 9 is a simplified diagram showing a controller for the USB Type-C plug 200 as shown in FIG. 2 that is being disconnected from the USB Type-C receptacle 500 as shown in FIG. 5 according to some embodiments of the present invention. This diagram is merely an example, which should not unduly limit the scope of the claims. One of ordinary skill in the art would recognize many variations, alternatives, and modifications. The controller 900 includes terminals 982, 984, 986, 988, 992, and 994. Additionally, the controller 900 includes a logic controller 910, a CC1/CC2 detector 920, a VBUS discharger 930, and a gate driver 940. For example, the controller 900 is a chip that includes the pins 982, 984, 986, 988, 992, and 994. As an example, the terminal 982 is the GND pin, the terminal 984 is the IC_CC2 pin, the terminal 986 is the IC_CC1 pin, the terminal 988 is the IC VBUS pin, the terminal 992 is the IC_GATE pin, and the terminal 994 is the IC_VDD pin. Although the above has been shown using a selected group of components for the controller 900 (e.g., a USB controller), there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the CC1/CC2 detector 920 is connected to the terminal 984 and the terminal 986, the VBUS discharger 930 is connected to the terminal 988, and the gate driver 940 is connected to the terminal 992. In some embodiments, the terminal 982 is connected to the GND pins (e.g., the A1 pin, the A12 pin, the B1 pin, and the B12 pin) of the USB Type-C plug 200, and the terminal 988 is connected to the VBUS pins (e.g., the A4 pin, the A9 pin, the B4 pin, and the B9 pin) of the USB Type-C plug 200. For example, the terminal 984 is connected to the VCONN pin (e.g., the B5 pin) of the USB Type-C plug 200 that corresponds to the CC2 pin (e.g., the B5 pin) of the USB Type-C receptacle 500. As an example, the terminal 986 is connected to the CC pin (e.g., the A5 pin) of the USB Type-C plug 200 that corresponds to the CC1 pin (e.g., the A5 pin) of the USB Type-C receptacle 500.

According to certain embodiments, a transistor 950 includes a drain terminal 952, a gate terminal 954, and a source terminal 956. For example, the drain terminal 952 receives a supply voltage 990. As an example, the supply voltage 990 is larger than or equal to 3.3 volts and smaller than or equal to 21 volts. For example, the gate terminal 954 is connected to the terminal 992 of the controller 900. In some examples, the source terminal 956 is connected to the VBUS pins (e.g., the A4 pin, the A9 pin, the B4 pin, and the B9 pin) of the USB Type-C plug 200 that correspond to the VBUS pins (e.g., the A4 pin, the A9 pin, the B4 pin, and the B9 pin) of the USB Type-C receptacle 500. In certain examples, the terminal 994 of the controller 900 receives the supply voltage 990.

According to some embodiments, the CC1/CC2 detector 920 is connected, through the terminal 984, to the VCONN pin (e.g., the B5 pin) of the USB Type-C plug 200 that corresponds to the CC2 pin (e.g., the B5 pin) of the USB Type-C receptacle 500, and the CC1/CC2 detector 920 is connected, through the terminal 986, to the CC pin (e.g., the A5 pin) of the USB Type-C plug 200 that corresponds to the CC1 pin (e.g., the A5 pin) of the USB Type-C receptacle 500. For example, the CC1/CC2 detector 920 receives a signal 985 from the VCONN pin (e.g., the B5 pin) of the USB Type-C plug 200 and receives a signal 987 from the CC pin (e.g., the A5 pin) of the USB Type-C plug 200.

In certain examples, the CC1/CC2 detector 920 processes the signals 985 and 987, and determines whether the VCONN pin (e.g., the B5 pin) and the CC pin (e.g., the A5 pin) of the USB Type-C plug 200 become disconnected from their corresponding pins of the USB Type-C receptacle 500. For example, for the VCONN pin (e.g., the B5 pin) of the USB Type-C plug 200, the corresponding pin is the CC2 pin (e.g., the B5 pin) of the USB Type-C receptacle 500. As an example, for the CC pin (e.g., the A5 pin) of the USB Type-C plug 200, the corresponding pin is the CC1 pin (e.g., the A5 pin) of the USB Type-C receptacle 500. In some examples, the CC1/CC2 detector 920 generates a detection signal 921 based at least in part on the signals 985 and 987. For example, the detection signal 921 indicates whether the VCONN pin (e.g., the B5 pin) and the CC pin (e.g., the A5 pin) of the USB Type-C plug 200 become disconnected from their corresponding pins of the USB Type-C receptacle 500. In certain embodiments, the logic controller 910 receives the detection signal 921 and generates control signals 931 and 941 based at least in part on the detection signal 921. For example, the control signal 931 is received and processed by the VBUS discharger 930. As an example, the control signal 941 is received and processed by the gate driver 940.

In certain embodiments, the gate driver 940 receives the control signal 941, processes information associated with the control signal 941, and generates a drive signal 993 based at least in part on the control signal 941. For example, the drive signal 993 is received by the gate terminal 954 of the transistor 950. As an example, the drive signal 993 is used to turn on and/or turn off the transistor 950. In some embodiments, the VBUS discharger 930 receives the control signal 931, processes information associated with the control signal 931, and generates a discharge signal 989 based at least in part on the control signal 931. For example, the discharge signal 989 is received by the VBUS pins (e.g., the A4 pin, the A9 pin, the B4 pin, and the B9 pin) of the USB Type-C plug 200. As an example, the discharge signal 989 is used to discharge the VBUS pins (e.g., the A4 pin, the A9 pin, the B4 pin, and the B9 pin) of the USB Type-C plug 200. For example, the discharge signal 989 is an output voltage of the VBUS discharger 930.

According to certain embodiments, if the detection signal 921 indicates that the VCONN pin (e.g., the B5 pin) of the USB Type-C plug 200 becomes disconnected from the CC2 pin (e.g., the B5 pin) of the USB Type-C receptacle 500 and the CC pin (e.g., the A5 pin) of the USB Type-C plug 200 becomes disconnected from the CC1 pin (e.g., the A5 pin) of the USB Type-C receptacle 500, the drive signal 993 turns off the transistor 950, and the VBUS discharger 930 discharges the VBUS pins (e.g., the A4 pin, the A9 pin, the B4 pin, and the B9 pin) of the USB Type-C plug 200 through the terminal 988 of the controller 900. According to some embodiments, if the detection signal 921 does not indicate that the VCONN pin (e.g., the B5 pin) of the USB Type-C plug 200 becomes disconnected from the CC2 pin (e.g., the B5 pin) of the USB Type-C receptacle 500 and the CC pin (e.g., the A5 pin) of the USB Type-C plug 200 becomes disconnected from the CC1 pin (e.g., the A5 pin) of the USB Type-C receptacle 500, the drive signal 993 does not turn off the transistor 950, and the VBUS discharger 930 does not discharge the VBUS pins (e.g., the A4 pin, the A9 pin, the B4 pin, and the B9 pin) of the USB Type-C plug 200.

As shown in FIG. 5, for the USB Type-C receptacle 500, each of the GND pins (e.g., the A1 pin, the A12 pin, the B1 pin, and the B12 pin) has a metal tongue of the length $L_x$, and each of the VBUS pins (e.g., the A4 pin, the A9 pin, the B4 pin, and the B9 pin) has a metal tongue of the length $L_x$ according to some embodiments. In certain examples, for the USB Type-C receptacle 500, each of the CC1 pin (e.g., the A5 pin) and the CC2 pin (e.g., the B5 pin) has a metal tongue of the length $L_y$. In some examples, the length $L_x$ is longer than the length $L_y$.

According to certain embodiments, when the USB Type-C plug 200 becomes disconnected from the USB Type-C receptacle 500, the VCONN pin (e.g., the B5 pin) of the USB Type-C plug 200 becomes disconnected from the CC2 pin (e.g., the B5 pin) of the USB Type-C receptacle 500 and the CC pin (e.g., the A5 pin) of the USB Type-C plug 200 becomes disconnected from the CC1 pin (e.g., the A5 pin) of the USB Type-C receptacle 500 before the VBUS pins (e.g., the A4 pin, the A9 pin, the B4 pin, and the B9 pin) of the USB Type-C plug 200 become disconnected from their corresponding VBUS pins of the USB Type-C receptacle 500. For example, the A4 pin (e.g., the VBUS pin) of the USB Type-C plug 200 corresponds to the A4 pin (e.g., the VBUS pin) of the USB Type-C receptacle 500. As an example, the A9 pin (e.g., the VBUS pin) of the USB Type-C plug 200 corresponds to the A9 pin (e.g., the VBUS pin) of the USB Type-C receptacle 500. For example, the B4 pin (e.g., the VBUS pin) of the USB Type-C plug 200 corresponds to the B4 pin (e.g., the VBUS pin) of the USB Type-C receptacle 500. As an example, the B9 pin (e.g., the VBUS pin) of the USB Type-C plug 200 corresponds to the B9 pin (e.g., the VBUS pin) of the USB Type-C receptacle 500.

In some examples, when the USB Type-C plug 200 becomes disconnected from the USB Type-C receptacle 500, during a delay time duration (e.g., Δt), the VCONN pin (e.g., the B5 pin) of the USB Type-C plug 200 is disconnected from the CC2 pin (e.g., the B5 pin) of the USB Type-C receptacle 500 and the CC pin (e.g., the A5 pin) of the USB Type-C plug 200 is disconnected from the CC1 pin (e.g., the A5 pin) of the USB Type-C receptacle 500, but the VBUS pins (e.g., the A4 pin, the A9 pin, the B4 pin, and the B9 pin) of the USB Type-C plug 200 remain connected to their corresponding VBUS pins of the USB Type-C receptacle 500. In certain examples, during the delay time duration (e.g., Δt), the VBUS pins (e.g., the A4 pin, the A9 pin, the B4 pin, and the B9 pin) of the USB Type-C plug 200 are discharged by the VBUS discharger 930. For example, at the end of the delay time duration (e.g., Δt), a voltage 980 of the VBUS pins (e.g., the A4 pin, the A9 pin, the B4 pin, and the B9 pin) of the USB Type-C plug 200 has decreased significantly to a lower magnitude (e.g., to zero volts) before the VBUS pins (e.g., the A4 pin, the A9 pin, the B4 pin, and the B9 pin) of the USB Type-C plug 200 become disconnected from their corresponding VBUS pins of the USB Type-C receptacle 500.

In some embodiments, the CC1/CC2 detector 920 detects whether the VCONN pin (e.g., the B5 pin) and the CC pin (e.g., the A5 pin) of the USB Type-C plug 200 become disconnected from their corresponding pins of the USB Type-C receptacle 500. For example, the detection performed by the CC1/CC2 detector 920 uses the detection of a high voltage level and/or a low voltage level. As an example, the detection performed by the CC1/CC2 detector 920 uses the impedance detection.

In certain embodiments, the transistor 950 is used to control the connection of the VBUS pins (e.g., the A4 pin, the A9 pin, the B4 pin, and the B9 pin) of the USB Type-C plug 200 to the voltage source of the supply voltage 990. In some examples, if the transistor 950 is turned on, the VBUS pins (e.g., the A4 pin, the A9 pin, the B4 pin, and the B9 pin) of the USB Type-C plug 200 is connected to the voltage source of the supply voltage 990, and the voltage 980 of the VBUS pins (e.g., the A4 pin, the A9 pin, the B4 pin, and the B9 pin) of the USB Type-C plug 200 is biased to the supply voltage 990. In certain examples, if the transistor 950 is turned off, the VBUS pins (e.g., the A4 pin, the A9 pin, the B4 pin, and the B9 pin) of the USB Type-C plug 200 is not connected to the voltage source of the supply voltage 990, and the voltage 980 of the VBUS pins (e.g., the A4 pin, the A9 pin, the B4 pin, and the B9 pin) of the USB Type-C plug 200 decreases from the supply voltage 990 during a discharging process. For example, the transistor 950 includes an NMOS transistor. As an example, the transistor 950 includes a PMOS transistor. For example, the transistor 950 includes common-source back-to-back MOSFETS. As an example, the transistor 950 includes common-drain back-to-back MOSFETS. In some embodiments, in response to the control signal 931, the VBUS discharger 930 discharges the VBUS pins (e.g., the A4 pin, the A9 pin, the B4 pin, and the B9 pin) of the USB Type-C plug 200. For example, the discharging process uses a constant-voltage discharge. As an example, the discharging process uses a constant-current discharge. For example, the discharging process uses a constant-impedance discharge.

As mentioned above and further emphasized here, FIG. 6 and FIG. 9 are merely examples, which should not unduly limit the scope of the claims. One of ordinary skill in the art would recognize many variations, alternatives, and modifications. In some examples, the controller 600 and the controller 900 are the same. For example, the terminals 682 and 982 are the same, the terminals 684 and 984 are the same, the terminals 686 and 986 are the same, the terminals 688 and 988 are the same, the terminals 692 and 992 are the same, and the terminals 694 and 994 are the same. As an example, the logic controller 610 and the logic controller 910 are the same, the CC1/CC2 detector 620 and the CC1/CC2 detector 920 are the same, the VBUS discharger 630 and the VBUS discharger 930 are the same, and the gate driver 640 and the gate driver 940 are the same.

In some embodiments, if a USB Type-C receptacle 500 is connected with a USB Type-C plug 200, the controller 600 is used to control the USB Type-C receptacle 500 as shown in FIG. 6, and the controller 900 is used to control the USB Type-C plug 200 as shown in FIG. 9. In certain embodiments, if a USB Type-C receptacle 500 is connected with a USB Type-C plug 200, the controller 600 is used to control the USB Type-C receptacle 500 as shown in FIG. 6, but the controller 900 is not used to control the USB Type-C plug 200. In some embodiments, if a USB Type-C receptacle 500 is connected with a USB Type-C plug 200, the controller 600 is not used to control the USB Type-C receptacle 500, but the controller 900 is used to control the USB Type-C plug 200 as shown in FIG. 9.

Some embodiments of the present invention provide USB receptacles and related controllers to reduce (e.g., eliminate) electric arcing between VBUS pins and GND pins of a USB Type-C receptacle and/or electric arcing between VBUS pins and GND pins of a USB Type-C plug, thus reducing (e.g., eliminating) aging caused by electric arcing for the USB Type-C receptacle and/or the USB Type-C plug during a hot swap process and also extending the service life of the USB Type-C receptacle and/or the USB Type-C plug.

Certain embodiments of the present invention reduce (e.g., eliminate) electric arcing between VBUS pins and GND pins of a USB Type-C receptacle when the VBUS pins of the USB Type-C receptacle become disconnected from their corresponding VBUS pins of a USB Type-C plug by disconnecting the VBUS pins of the USB Type-C receptacle from the voltage source of a supply voltage and also discharging the VBUS pins of the USB Type-C receptacle after it is detected that the CC2 pin and the CC1 pin of the USB Type-C receptacle become disconnected from their corresponding pins of the USB Type-C plug. Some embodiments of the present invention reduce (e.g., eliminate) electric arcing between VBUS pins and GND pins of a USB Type-C plug when the VBUS pins of the USB Type-C plug become disconnected from their corresponding VBUS pins of a USB Type-C receptacle by disconnecting the VBUS pins of the USB Type-C plug from the voltage source of a supply voltage and also discharging the VBUS pins of the USB Type-C plug after it is detected that the VCONN pin and the CC pin of the USB Type-C plug become disconnected from their corresponding pins of the USB Type-C receptacle.

According to some embodiments, a USB Type-C connector includes: a GND pin including a first metal tongue; a VBUS pin including a second metal tongue; a CC1 pin including a third metal tongue; and a CC2 pin including a fourth metal tongue; wherein: each metal tongue of the first metal tongue and the second metal tongue has a first predetermined length; and each metal tongue of the third metal tongue and the fourth metal tongue has a second predetermined length; wherein the first predetermined length is larger than the second predetermined length. For example, the USB Type-C connector is implemented according to at least FIG. 5. As an example, the USB Type-C connector further includes: additional pins including additional corresponding metal tongues respectively; wherein each metal tongue of the additional corresponding metal tongues has the second predetermined length.

According to certain embodiments, a controller for one or more USB connectors includes: a first controller terminal configured to receive a first signal from a first pin of a first USB connector; a second controller terminal configured to receive a second signal from a second pin of the first USB connector; a third controller terminal configured to be connected directly or indirectly to a third pin of the first USB connector; and a fourth controller terminal configured to output a drive signal to a first transistor terminal of a transistor, the transistor further including a second transistor terminal and a third transistor terminal, the second transistor terminal being biased to a supply voltage, the third transistor terminal being connected to the third pin of the first USB connector; wherein the controller is configured to: process information associated with the first signal and the second signal; and determine, based at least in part on the first signal and the second signal, whether the first pin and the second pin of the first USB connector become disconnected from corresponding pins of a second USB connector; wherein the controller is further configured to, if the first pin and the second pin of the first USB connector become disconnected from the corresponding pins of the second USB connector: change the drive signal to turn off the transistor before the third pin of the first USB connector becomes disconnected from a corresponding pin of the second USB connector; and discharge the third pin of the first USB connector through the third controller terminal to reduce a pin voltage of the third pin of the first USB connector from the supply voltage to a voltage level before the third pin of the first USB connector becomes disconnected from the corresponding pin of the second USB connector; wherein the voltage level is smaller than the supply voltage. For example, the controller is implemented according to FIG. 6, FIG. 8, and/or FIG. 9.

As an example, the first USB connector is a USB Type-C receptacle; and the second USB connector is a USB Type-C plug. For example, the first pin of the first USB connector is a CC2 pin of the USB Type-C receptacle; the second pin of the first USB connector is a CC1 pin of the USB Type-C receptacle; and the third pin of the first USB connector is a VBUS pin of the USB Type-C receptacle. As an example, the corresponding pins of the second USB connector include a VCONN pin and a CC pin of the USB Type-C plug; wherein: the VCONN pin of the USB Type-C plug corresponds to the first pin of the first USB connector; and the CC pin of the USB Type-C plug corresponds to the second pin of the first USB connector. For example, the corresponding pin of the second USB connector is a VBUS pin of the USB Type-C plug.

For example, the first USB connector is a USB Type-C plug; and the second USB connector is a USB Type-C receptacle. As an example, the first pin of the first USB connector is a VCONN pin of the USB Type-C plug; the second pin of the first USB connector is a CC pin of the USB Type-C plug; and the third pin of the first USB connector is a VBUS pin of the USB Type-C plug. For example, the corresponding pins of the second USB connector include a CC2 pin and a CC1 pin of the USB Type-C receptacle; wherein: the CC2 pin of the USB Type-C receptacle corresponds to the first pin of the first USB connector; and the CC1 pin of the USB Type-C receptacle corresponds to the second pin of the first USB connector. As an example, the corresponding pin of the second USB connector is a VBUS pin of the USB Type-C receptacle. For example, the voltage level is equal to zero volts.

According to some embodiments, a USB controller for one or more USB connectors includes: a detector configured to receive a first input signal from a first pin of a first USB connector and receive a second input signal from a second pin of the first USB connector and generate a detection signal based at least in part on the first input signal and the second input signal; a logic controller configured to receive the detection signal and generate a first control signal and a second control signal based at least in part on the detection signal; a driver configured to receive the first control signal, generate a drive signal based at least in part on the first control signal, and output the drive signal to a first transistor terminal of a transistor, the transistor further including a second transistor terminal and a third transistor terminal, the second transistor terminal being biased to a supply voltage, the third transistor terminal being connected to a third pin of the first USB connector; and a discharger configured to receive the second control signal, the discharger being further configured to be connected to the third pin of the first USB connector; wherein the detector is further configured to: determine, based at least in part on the first input signal and the second input signal, whether the first pin and the second pin of the first USB connector become disconnected from corresponding pins of a second USB connector; and generate the detection signal to indicate whether the first pin and the second pin of the first USB connector become disconnected from the corresponding pins of the second USB connector; wherein the logic controller is further configured to, if the detection signal indicates that the first pin and the second pin of the first USB connector become disconnected from the corresponding pins of the second USB connector: output the first control signal to the driver to change the drive signal to turn off the transistor before the third pin of the first USB connector becomes disconnected from a corresponding pin of the second USB connector; and output the second control signal to the discharger to discharge the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage. For example, the controller is implemented according to FIG. 6, FIG. 8, and/or FIG. 9.

As an example, the detector is further configured to, if the first pin and the second pin of the first USB connector become disconnected from the corresponding pins of the second USB connector, change the detection signal from a first logic level to a second logic level. For example, the first logic level is a logic low level; and the second logic level is a logic high level. As an example, the driver is further configured to, if the first pin and the second pin of the first USB connector become disconnected from the corresponding pins of the second USB connector, in response to the first control signal, change the drive signal from a third logic level to a fourth logic level to turn off the transistor before the third pin of the first USB connector becomes disconnected from the corresponding pin of the second USB connector. For example, the third logic level is a logic high level; and the fourth logic level is a logic low level. As an example, the discharger is further configured to, if the first pin and the second pin of the first USB connector become disconnected from the corresponding pins of the second USB connector, in response to the second control signal, discharge the third pin of the first USB connector to reduce the pin voltage of the third pin of the first USB connector from the supply voltage to the voltage level before the third pin of the first USB connector becomes disconnected from the corresponding pin of the second USB connector.

For example, the first USB connector is a USB Type-C receptacle; and the second USB connector is a USB Type-C plug. As an example, the first USB connector is a USB Type-C plug; and the second USB connector is a USB Type-C receptacle. For example, the voltage level is equal to zero volts.

According to certain embodiments, a method for one or more USB connectors includes: receiving a first signal from a first pin of a first USB connector; receiving a second signal from a second pin of the first USB connector; generating a drive signal based at least in part on the first control signal and the second control signal; processing information associated with the first signal and the second signal; determining, based at least in part on the first signal and the second signal, whether the first pin and the second pin of the first USB connector become disconnected from corresponding pins of a second USB connector; and if the first pin and the second pin of the first USB connector become disconnected from the corresponding pins of the second USB connector: outputting the drive signal to a first transistor terminal of a transistor to turn off the transistor before a third pin of the first USB connector becomes disconnected from a corresponding pin of the second USB connector, the transistor further including a second transistor terminal and a third transistor terminal, the second transistor terminal being biased to a supply voltage, the third transistor terminal being connected to the third pin of the first USB connector; and discharging the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage. For example, the method is implemented according to FIG. 6, FIG. 8, and/or FIG. 9. As an example, the first USB connector is a USB Type-C receptacle; and the second USB connector is a USB Type-C plug. For example, the first USB connector is a USB Type-C plug; and the second USB connector is a USB Type-C receptacle.

According to some embodiments, a method for one or more USB connectors includes: receiving a first input signal from a first pin of a first USB connector; receiving a second input signal from a second pin of the first USB connector; determining, based at least in part on the first input signal and the second input signal, whether the first pin and the second pin of the first USB connector become disconnected from corresponding pins of a second USB connector; generating a detection signal to indicate whether the first pin and the second pin of the first USB connector become disconnected from the corresponding pins of the second USB connector; receiving the detection signal; and if the detection signal indicates that the first pin and the second pin of the first USB connector become disconnected from the corresponding pins of the second USB connector: generating a first control signal and a second control signal based at least in part on the detection signal; outputting, based at least in part on the first control signal, the drive signal to a first transistor terminal of a transistor to turn off the transistor before a third pin of the first USB connector becomes disconnected from a corresponding pin of the second USB connector, the transistor further including a second transistor terminal and a third transistor terminal, the second transistor terminal being biased to a supply voltage, the third transistor terminal being connected to the third pin of the first USB connector; and discharging, based at least in part on the second control signal, the third pin of the first USB connector to reduce a pin voltage of the third pin of the first USB connector from the supply voltage to a voltage level before the third pin of the first USB connector becomes disconnected from the corresponding pin of the second USB connector; wherein the voltage level is smaller than the supply voltage. For example, the method is implemented according to FIG. 6, FIG. 8, and/or FIG. 9. As an example, the first USB connector is a USB Type-C receptacle; and the second USB connector is a USB Type-C plug. For example, the first USB connector is a USB Type-C plug; and the second USB connector is a USB Type-C receptacle.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A USB controller for one or more USB connectors, the controller comprising:
   a detector configured to receive a first input signal from a first pin of a first USB connector and receive a second input signal from a second pin of the first USB connector and generate a detection signal based at least in part on the first input signal and the second input signal;
   a logic controller configured to receive the detection signal and generate a first control signal and a second control signal based at least in part on the detection signal;
   a driver configured to receive the first control signal, generate a drive signal based at least in part on the first control signal, and output the drive signal to a first transistor terminal of a transistor, the transistor further including a second transistor terminal and a third transistor terminal, the second transistor terminal being biased to a supply voltage, the third transistor terminal being connected to a third pin of the first USB connector; and
   a discharger configured to receive the second control signal, the discharger being further configured to be connected to the third pin of the first USB connector;
   wherein the detector is further configured to:
      determine, based at least in part on the first input signal and the second input signal, whether the first pin and the second pin of the first USB connector become disconnected from corresponding pins of a second USB connector; and
      generate the detection signal to indicate whether the first pin and the second pin of the first USB connector become disconnected from the corresponding pins of the second USB connector;
   wherein the logic controller is further configured to, if the detection signal indicates that the first pin and the second pin of the first USB connector become disconnected from the corresponding pins of the second USB connector:
      output the first control signal to the driver to change the drive signal to turn off the transistor before the third pin of the first USB connector becomes disconnected from a corresponding pin of the second USB connector; and
      output the second control signal to the discharger to discharge the third pin of the first USB connector to reduce a pin voltage of the third pin of the first USB connector from the supply voltage to a voltage level before the third pin of the first USB connector becomes disconnected from the corresponding pin of the second USB connector;
      wherein the voltage level is smaller than the supply voltage.

2. The USB controller of claim 1 wherein the detector is further configured to, if the first pin and the second pin of the first USB connector become disconnected from the corresponding pins of the second USB connector, change the detection signal from a first logic level to a second logic level.

3. The USB controller of claim 2 wherein:
   the first logic level is a logic low level; and
   the second logic level is a logic high level.

4. The USB controller of claim 2 wherein the driver is further configured to, if the first pin and the second pin of the first USB connector become disconnected from the corresponding pins of the second USB connector, in response to the first control signal, change the drive signal from a third logic level to a fourth logic level to turn off the transistor before the third pin of the first USB connector becomes disconnected from the corresponding pin of the second USB connector.

5. The USB controller of claim 4 wherein:
   the third logic level is a logic high level; and
   the fourth logic level is a logic low level.

6. The USB controller of claim 4 wherein the discharger is further configured to, if the first pin and the second pin of the first USB connector become disconnected from the corresponding pins of the second USB connector, in response to the second control signal, discharge the third pin of the first USB connector to reduce the pin voltage of the third pin of the first USB connector from the supply voltage to the voltage level before the third pin of the first USB connector becomes disconnected from the corresponding pin of the second USB connector.

7. The controller of claim 1 wherein:
the first USB connector is a USB Type-C receptacle; and
the second USB connector is a USB Type-C plug.

8. The controller of claim 1 wherein:
the first USB connector is a USB Type-C plug; and
the second USB connector is a USB Type-C receptacle.

9. The controller of claim 1 wherein the voltage level is equal to zero volts.

10. A method for one or more USB connectors, the method comprising:
receiving a first input signal from a first pin of a first USB connector;
receiving a second input signal from a second pin of the first USB connector;
determining, based at least in part on the first input signal and the second input signal, whether the first pin and the second pin of the first USB connector become disconnected from corresponding pins of a second USB connector;
generating a detection signal to indicate whether the first pin and the second pin of the first USB connector become disconnected from the corresponding pins of the second USB connector;
receiving the detection signal; and
if the detection signal indicates that the first pin and the second pin of the first USB connector become disconnected from the corresponding pins of the second USB connector:
generating a first control signal and a second control signal based at least in part on the detection signal;
outputting, based at least in part on the first control signal, a drive signal to a first transistor terminal of a transistor to turn off the transistor before a third pin of the first USB connector becomes disconnected from a corresponding pin of the second USB connector, the transistor further including a second transistor terminal and a third transistor terminal, the second transistor terminal being biased to a supply voltage, the third transistor terminal being connected to the third pin of the first USB connector; and
discharging, based at least in part on the second control signal, the third pin of the first USB connector to reduce a pin voltage of the third pin of the first USB connector from the supply voltage to a voltage level before the third pin of the first USB connector becomes disconnected from the corresponding pin of the second USB connector;
wherein the voltage level is smaller than the supply voltage.

11. The method of claim 10 wherein:
the first USB connector is a USB Type-C receptacle; and
the second USB connector is a USB Type-C plug.

12. The method of claim 10 wherein:
the first USB connector is a USB Type-C plug; and
the second USB connector is a USB Type-C receptacle.

* * * * *